(12) United States Patent
Kile

(10) Patent No.: US 9,516,811 B1
(45) Date of Patent: Dec. 13, 2016

(54) COMBINE HARVESTER GRAIN BULK TANK UNLOADING SYSTEM

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 0 days.

(21) Appl. No.: 14/714,608

(22) Filed: May 18, 2015

Related U.S. Application Data

(63) Continuation of application No. 13/418,499, filed on Mar. 13, 2012, now Pat. No. 9,033,643.

(51) Int. Cl.
*A01D 41/12* (2006.01)
*B60P 1/42* (2006.01)

(52) U.S. Cl.
CPC .......... *A01D 41/1217* (2013.01); *B60P 1/42* (2013.01)

(58) Field of Classification Search
CPC A01D 41/02; A01D 41/1208; A01D 41/1217; B60P 1/42; B65G 33/34; B65G 33/14
See application file for complete search history.

(56) References Cited

U.S. PATENT DOCUMENTS

| | | | |
|---|---|---|---|
| 2,676,721 A | 4/1954 | Hansen | |
| 2,953,360 A | 9/1960 | Kline | |
| 2,998,152 A | 8/1961 | Wognum et al. | |
| 3,108,703 A * | 10/1963 | Horne | A01D 41/1208 414/505 |
| 3,152,702 A * | 10/1964 | Klemm | A01D 41/1208 198/602 |
| 3,265,226 A * | 8/1966 | Malcolm | A01D 41/1208 198/570 |
| 3,275,176 A | 9/1966 | Kasten | |
| 3,421,740 A | 1/1969 | Behrens | |
| 3,466,018 A | 9/1969 | Nourse | |
| 3,549,026 A | 12/1970 | Klee | |
| 4,093,087 A | 6/1978 | DeCoene | |
| 4,171,180 A | 10/1979 | Wagstaff et al. | |
| 4,274,790 A | 6/1981 | Barker | |
| 5,199,638 A | 4/1993 | Fischer | |
| 5,443,352 A | 8/1995 | Schuhmacher | |
| 5,511,925 A | 4/1996 | Muth | |
| 5,871,081 A | 2/1999 | Gaalswyk et al. | |
| 6,042,326 A | 3/2000 | Thomas et al. | |

(Continued)

FOREIGN PATENT DOCUMENTS

CA   1191032 A2 * 7/1985 ......... A01D 41/1208

*Primary Examiner* — Glenn Myers
(74) *Attorney, Agent, or Firm* — Michael W. Goltry; Robert A. Parsons; Parsons & Goltry

(57) ABSTRACT

A combine harvester grain bulk tank and grain unloading system includes opposed bulk tank augers and an unloading auger formed in a grain bulk tank of a combine harvester. The bulk tank augers are for receiving and conveying grain through the bulk tank to the unloading auger, and the unloading auger is for receiving grain from the bulk tank augers and conveying grain to a grain unloading spout for grain unloading. A primary drive gear is coupled to the unloading auger and to an input, a secondary drive gear is drivingly coupled to the bulk tank augers, and a clutch is coupled between the primary drive gear and the secondary drive gear, which is movable between an engaged position for transferring power from the input to the unloading auger and to the bulk tank augers, and a disengaged position for isolating the bulk tank augers from the primary drive gear.

2 Claims, 3 Drawing Sheets

(56) References Cited

U.S. PATENT DOCUMENTS

| | | | |
|---|---|---|---|
| 6,736,722 B1 * | 5/2004 | Pope | A01D 41/1208 460/119 |
| 6,776,569 B1 | 8/2004 | McMahon et al. | |
| 7,040,980 B1 | 5/2006 | Kestel | |
| 7,195,440 B2 | 3/2007 | Lambert | |
| 7,494,409 B2 | 2/2009 | Voss et al. | |
| 7,516,838 B2 | 4/2009 | Dutschke | |
| 7,544,031 B2 | 6/2009 | Kaeb et al. | |
| 9,137,945 B2 * | 9/2015 | Farley | A01D 41/1217 |
| 2004/0067125 A1 * | 4/2004 | Dillon | A01D 41/1208 414/502 |
| 2007/0183878 A1 | 8/2007 | Talbi et al. | |
| 2013/0149088 A1 * | 6/2013 | Matousek | B60P 1/40 414/502 |

* cited by examiner

COMBINE HARVESTER GRAIN BULK TANK UNLOADING SYSTEM

FIELD OF THE INVENTION

The present invention relates to combine harvesters.

More particularly, the present invention relates to grain bulk tanks of combine harvesters.

In a further and more specific aspect, the present invention relates to systems and methods for unloading grain from grain bulk tanks of combine harvesters.

BACKGROUND OF THE INVENTION

Agriculture is a major industry in the U.S., which is a net exporter of food. As of 2009 there were approximately 2.2 million farms in the U.S. covering an area of approximately 920 million acres. Although in 1800 approximately ninety percent of the entire U.S. population was employed in agriculture, present day numbers have dropped to approximately two percent due largely to the development and implementation of large, automated agricultural equipment, such as combine harvesters, which have replaced large numbers of farm workers.

The crops grown in the U.S., such as wheat, barley, and rye, are only partly edible. While the seeds or grains at the top of each plant are edible and useful for making products such as bread and cereal, the rest of the plant, which is known as the chaff, is inedible and has to be discarded. Before modern-day machines were developed, such as in the 1800's, agricultural workers had to harvest crops by carrying out a series of laborious operations one after another. First they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

In operation, a combine harvester is driven through a field of a growing crop, whereby the combine harvester cuts, threshes, and separates the grain from the chaff using rotating blades, wheels, sieves, and elevators. The grain collects in a tank inside the combine harvester, which is periodically emptied into tractors that drive alongside, while the chaff is ejected onto the field from an ejection spout at the back of the combine harvester.

In general, a combine harvester includes a header, a pickup reel, a cutter, a threshing drum, sieves, a collection tank, and conveyors, such as rotating belts and spinning augers. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings separating the grains from the chaff to form threshings, namely, the chaff and the separated grains. A conveyance conveys the threshings along the thresher from an upstream location of thresher to a downstream location of thresher as the thresher rotates and the grains fall through sieves into a collection or grain bulk tank inside the combine harvester, which is periodically emptied, such as through a grain ejection spout into tractors that drive alongside, while a conveyor takes up and conveys the chaff to the chaff ejection spout for ejection onto the field. Some combine harvesters have a rotating spreader mechanism that throws the chaff over a wide area, while others have bailers that bail the chaff for later use, such as for animal bedding.

Most combine harvester bulk tanks utilize an arrangement of bulk tank augers used to take up and convey grain to an unloading auger, which, in turn, takes up the grain received from the bulk tank augers and applies the grain to the grain ejection spout for unloading, such is into an awaiting tractor. The bulk tank augers and the unloading auger are deactivated during until the grain bulk tank is full or otherwise in need of emptying. Because the bulk tank and unloading augers work concurrently during normal operation, they are prone to becoming clogged with grain, which can introduce unsafe loads across the bulk tank and unloading augers and corresponding damage to the auger drivetrain, and which can lead to costly downtime required to remove the clogs to free the augers for resumption of normal operation.

SUMMARY OF THE INVENTION

According to the principle of the invention, a combine harvester grain bulk tank and grain unloading system includes a grain bulk tank of a combine harvester, and opposed first and second bulk tank augers and an unloading auger formed in the grain bulk tank. The first and second bulk tank augers are for receiving grain in the grain bulk tank and conveying grain through the bulk tank to the unloading auger, and the unloading auger is for receiving grain from the first and second bulk tank augers and conveying grain received from the first and second bulk tank augers to a grain unloading spout for grain unloading. A primary drive gear is coupled to the unloading auger and to an input for transferring power from the input to the unloading auger. A secondary drive gear is drivingly coupled to a first driven gear coupled to the first bulk tank auger, and to a second driven gear coupled to the second bulk tank auger. A clutch is coupled between the primary drive gear and the secondary drive gear. The clutch is movable between an engaged position for transferring power from the primary drive gear to the secondary drive gear, and a disengaged position isolating the secondary drive gear from the primary drive gear. The first and second bulk tank augers are horizontal, and the unloading auger is vertical. The first bulk tank auger is further parallel with respect to the second bulk tank auger. The primary drive gear, the secondary drive gear, the first and second driven gears, and the clutch are located exteriorly of the grain bulk tank.

According to the principle of the invention, a combine harvester grain bulk tank and grain unloading system includes a grain bulk tank of a combine harvester, and opposed first and second bulk tank augers and an unloading auger formed in the grain bulk tank. The first and second bulk tank augers are for receiving grain in the grain bulk tank and conveying grain through the bulk tank to the unloading auger, and the unloading auger is for receiving grain from the first and second bulk tank augers and conveying grain received from the first and second bulk tank augers to a grain unloading spout for grain unloading. A primary drive gear is coupled to the unloading auger and to an input for transferring power from the input to the unloading auger. The system further includes a secondary drive gear, a first driven gear coupled to the first bulk tank auger, a second driven gear coupled to the second bulk tank auger, and an endless belt drivingly coupling the second drive gear to the first and second driven gears. A clutch is coupled between the primary drive gear and the secondary drive gear.

The clutch is movable between an engaged position for transferring power from the primary drive gear to the secondary drive gear, and a disengaged position isolating the secondary drive gear from the primary drive gear. The first and second bulk tank augers are horizontal, and the unloading auger is vertical. The first bulk tank auger is parallel with respect to the second bulk tank auger. The primary drive gear, the secondary drive gear, the first and second driven gears, and the clutch are located exteriorly of the grain bulk tank.

According to the principle of the invention, a combine harvester grain bulk tank and grain unloading system includes a grain bulk tank of a combine harvester, and opposed first and second bulk tank augers and an unloading auger formed in the grain bulk tank. The first and second bulk tank augers are for receiving grain in the grain bulk tank and conveying grain through the bulk tank to the unloading auger, and the unloading auger is for receiving grain from the first and second bulk tank augers and conveying grain received from the first and second bulk tank augers to a grain unloading spout for grain unloading. A primary drive gear is coupled to the unloading auger and to an input, a secondary drive gear is drivingly coupled to the first bulk tank auger and to the second bulk tank auger, and a clutch is coupled between the primary drive gear and the secondary drive gear. The clutch is movable between an engaged position engaging the primary drive gear to the secondary drive gear for transferring power from the input to the unloading auger and to the first and second bulk tank augers, and a disengaged position disengaging the primary drive gear from the secondary drive gear for isolating the first and second bulk tank augers from the primary drive gear and from the input. The first and second bulk tank augers are horizontal, and the unloading auger is vertical. The first bulk tank auger is parallel with respect to the second bulk tank auger. The primary drive gear, the secondary drive gear, and the clutch are located exteriorly of the grain bulk tank.

Consistent with the foregoing summary of preferred embodiments, and the ensuing detailed description, which are to be taken together, the invention also contemplates associated apparatus and method embodiments.

BRIEF DESCRIPTION OF THE DRAWINGS

Referring to the drawings.

DETAILED DESCRIPTION

Figure 1:
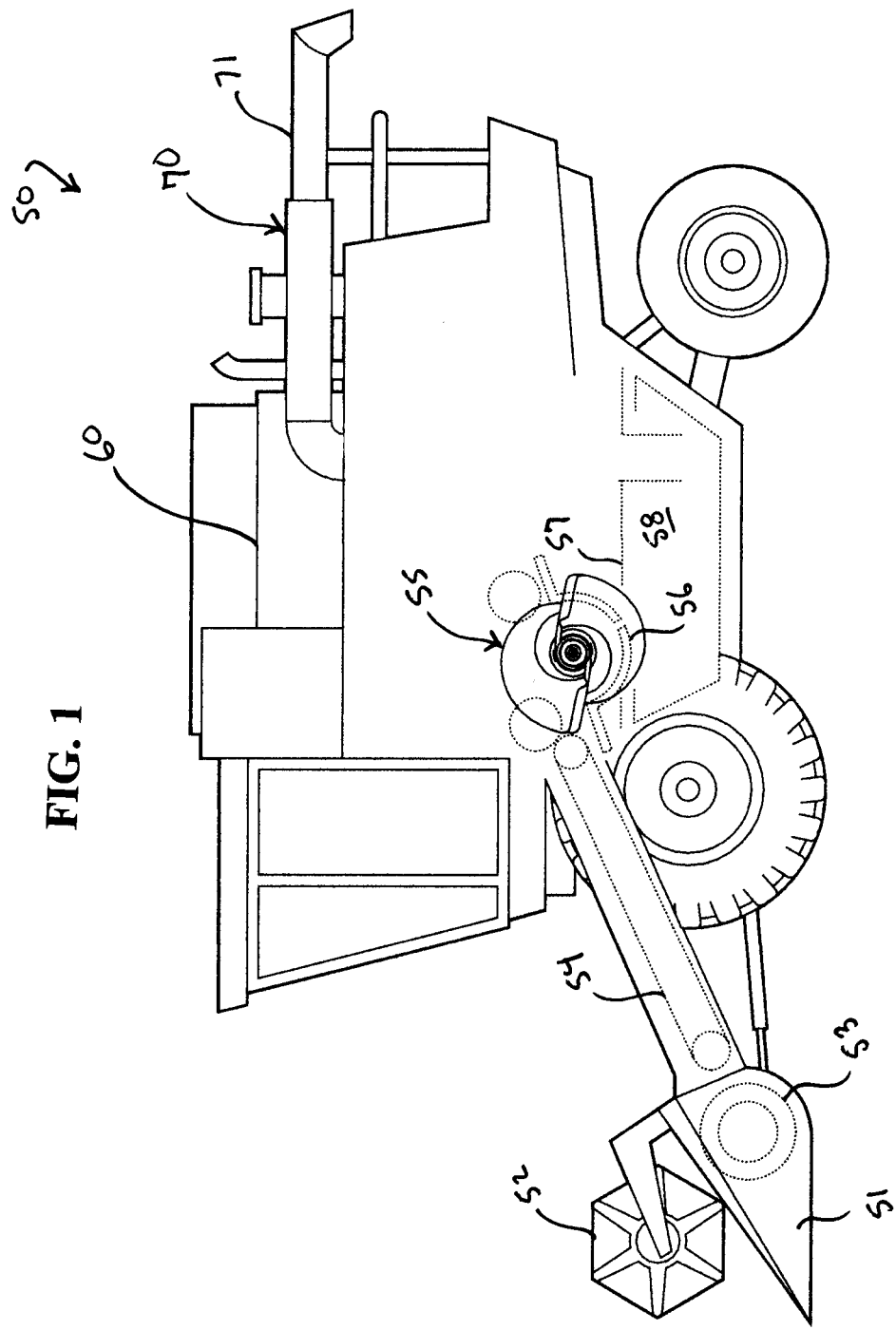
FIG. 1 is a highly generalized schematic representation of a combine harvester incorporating a combine harvester grain bulk tank and grain unloading system.

Turning now to the drawings, in which like reference characters indicate corresponding elements throughout the several views, attention is first directed to FIG. 1 in which there is seen a highly generalized schematic representation of a combine harvester 50 including a header 51, a pickup reel 52, a cutter 53, a conveyer 54 formed between cutter 53 and thresher 55, a combine harvester concave or thresher concave 56 operatively positioned underneath thresher 55, sieves 57, a collection tank 58, and an array of conveyors, such as rotating belts and spinning augers. In the operation of combine harvester 50 as it is driven through a crop header 51 gathers the crop, and pickup reel 52 pushes the crop to cutter 53, which cuts the crop at the base near ground level to form crop cuttings or, simply, cuttings. Conveyor 54 picks up the cuttings from cutter 53, and conveys the cuttings to the thresher 55 for threshing in the normal manner. Thresher 55 rotates and threshes the cuttings along thresher concave 56 separating the grains from the chaff to form threshings, namely, the chaff and the separated grains. As thresher 55 rotates and threshes the cuttings to form threshings, the separated grain fall through sieves 57 into collection tank 58 inside combine harvester 50. An auger or other conveyance takes up the grain in collection tank 58 and delivers the grain the a grain bulk tank 60 formed in combine harvester 50, which is periodically emptied through a grain unloading spout 71, such as into tractors that drive alongside, with the use of a grain bulk tank unloading system denoted generally at 70 and which is constructed and arranged in accordance with the principle of the invention, while a conveyor takes up and conveys the chaff to an ejection spout for ejection onto the field. Grain unloading spout 71 is considered part of grain bulk tank unloading system 70. With the exception of the specific details surrounding grain bulk tank unloading system 70 and its association with grain bulk tank 60 and grain unloading spout 71, combine harvester 50 is exemplary of a typical combine harvester well known in the art, further details of which will readily occur to the skilled artisan and will not be discussed in further detail.

Figure 2:
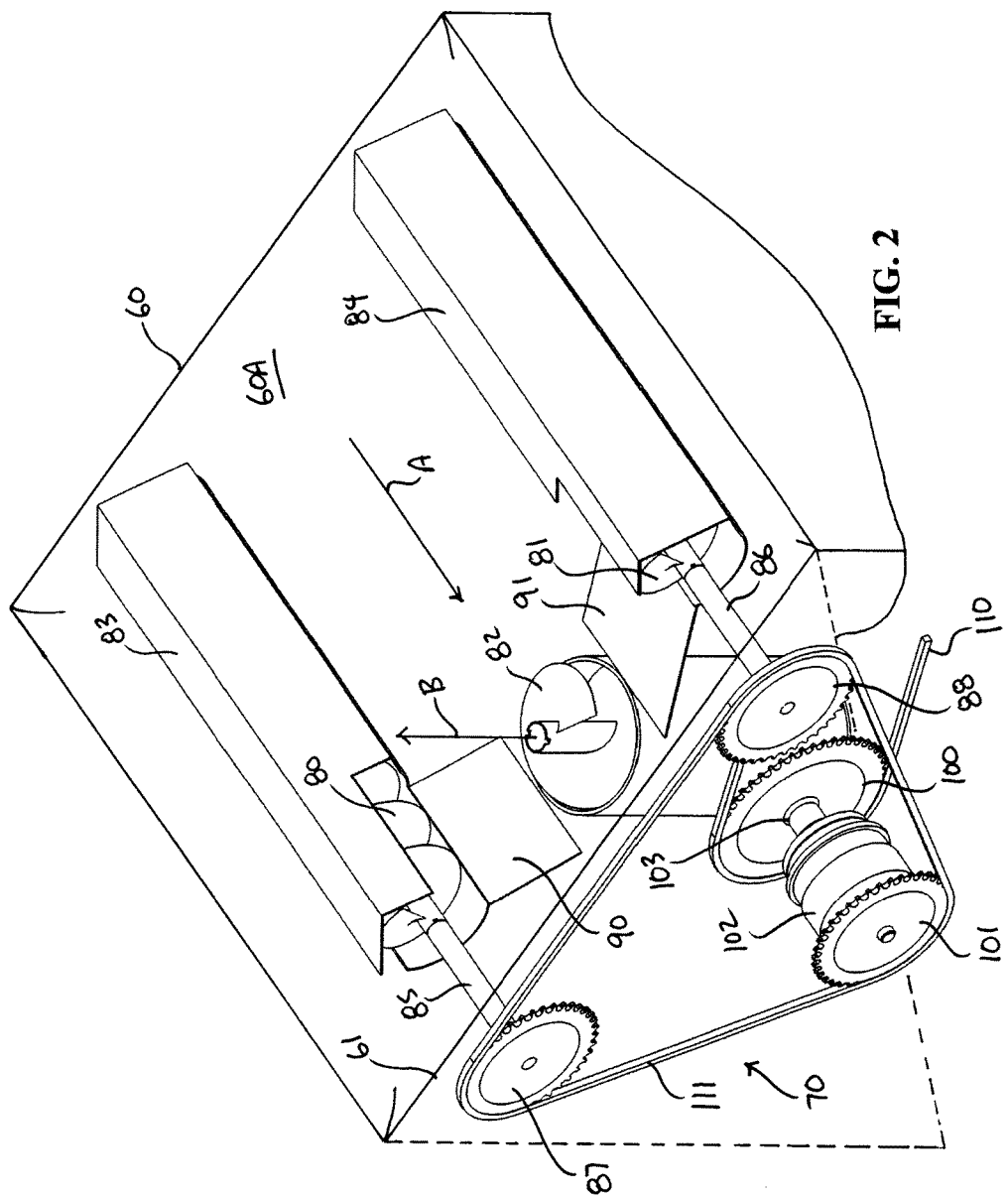
FIG. 2 is a highly generalized representation of a combine harvester grain bulk tank and grain unloading system constructed and arranged in accordance with the principle of the invention.
Figure 3:
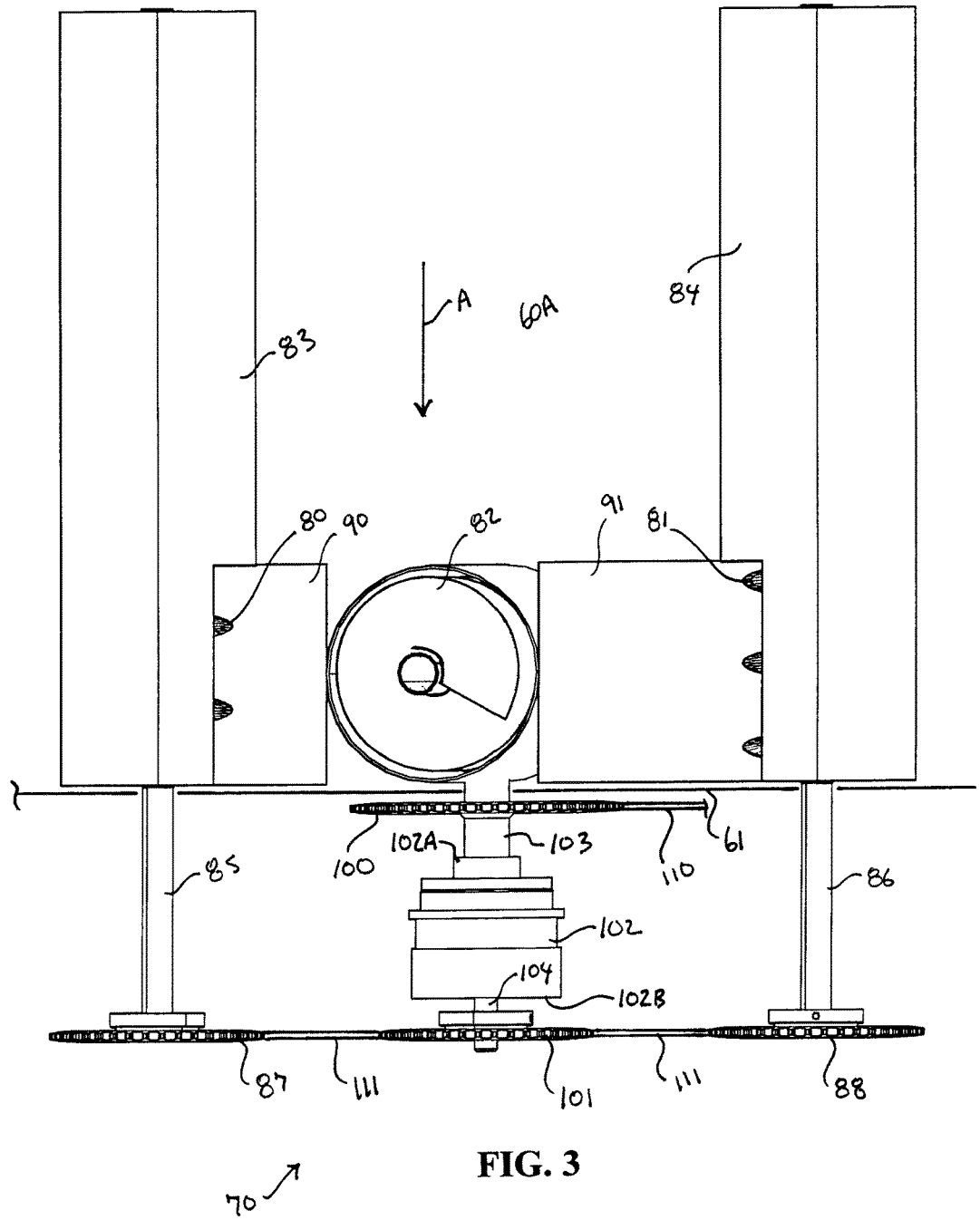
FIG. 3 is a highly generalized top plan view of a combine harvester grain bulk tank and grain unloading system constructed and arranged in accordance with the principle of the invention.

According to the principle of the invention, FIG. 2 is a highly generalized representation of grain bulk tank 60 and grain bulk tank unloading system 70 constructed and arranged in accordance with the principle of the invention, and FIG. 3 is a highly generalized top plan view of system 70. Referencing FIGS. 2 and 3, system 70 consists of opposed bulk tank augers 80 and 81 and an unloading auger 82 formed in bulk tank 60, namely, in volume 60A defined by bulk tank 60. Bulk tank augers 80 and 81 are for receiving grain in volume 60A of bulk tank 60 and conveying grain horizontally through bulk tank 60 in the direction generally indicated by arrowed line A to unloading auger 82, and unloading auger 82 is, in turn, for receiving grain from bulk tank augers 80 and 81 and conveying grain received from bulk tank augers 80 and 81 vertically through bulk tank 60 in the direction generally indicated by arrowed line B in FIG. 2 to grain unloading spout 71 in FIG. 1 for grain unloading in the normal manner.

Bulk tank augers 80 and 81 opposed one another and are the mirror image of one another, are located on either side of bulk tank 60, are parallel with respect to each other, are horizontal in volume 60A of bulk tank 60 as illustrated, and are identical to one another in every respect. Bulk tank augers 80 and 81 are housed in open, protective shrouds 83 and 84, respectively, and are formed about corresponding auger shafts 85 and 86, which, as also illustrated in FIG. 3, concurrently extend outwardly through an end 61 of bulk tank 60 to attached driven gears 87 and 88, respectively, which are located exteriorly of bulk tank 60, namely, exteriorly of and alongside end 61 of bulk tank 60. Auger shafts 85 and 86 are mounted for rotation to bulk tank 60 in a conventional and well-known manner for facilitating rotation of bulk tank augers 80 and 81 in the normal manner for acting on and conveying grain through volume 60A of bulk tank 60 in the direction indicated by arrowed line A to unloading auger 82. Rotation of bulk tank augers 80 and 81 is made through the application of power or an input to driven gears 87 and 88 of auger shafts 85 and 86, respectively, to rotate driven gears 87 and 88. Driven gear 87 is rigidly mounted to auger shaft 85, and auger shaft 85 provides a coupling of driven gear 87 to bulk tank auger 80 to impart rotation to bulk tank auger 80 in response to a corresponding input applied to driven gear 87 to drive driven gear 87 for rotation. Driven gear 88 is rigidly mounted to auger shaft 86, and auger shaft 86 provides a coupling of driven gear 88 to bulk tank auger 81 to impart rotation to bulk tank auger 81 in response to a corresponding input applied to driven gear 88 to drive driven gear 88 for rotation.

Unloading auger 82 is located in volume 60A of bulk tank 60 between bulk tank augers 80 and 81, and is vertical in volume 60A of bulk tank 60 with respect to bulk tank augers 80 and 81, which are horizontal in volume 60A of bulk tank 60. Unloading auger 82 is mounted for rotation to bulk tank 60 in a conventional and well-known manner for conveying grain received from bulk tank augers 80 and 81 vertically in the direction generally indicated by arrowed line B in FIG. 2 to grain unloading spout 71 in FIG. 1 for grain unloading in the normal manner. Shrouds 83 and 84 are formed with chutes 90 and 91, which are located on either side of unloading auger 82. Chute 90 of shroud 83 extends between shroud 83 and unloading auger 82 on one side of unloading auger 82, and chute 91 of shroud 84 extends between shroud 84 and unloading auger 82 on the opposing side of unloading auger 82. In response to rotation of bulk tank augers 80 and 81, bulk tank augers 80 and 81 convey grain horizontally through bulk tank 60 in the direction indicated by arrowed line A to chutes 90 and 91, and the delivered grain to chutes 90 and 91 then falls downwardly along chutes 90 and 91 to unloading auger 82 for grain unloading through grain unloading spout 71 shown in FIG. 1.

Looking to FIG. 3, system 70 incorporates a primary drive gear 100, a secondary drive gear 101, and a clutch 102. Primary drive gear 100, secondary drive gear 101, and clutch 102 are each located exteriorly of bulk tank 60, namely, exteriorly of, and alongside, end 61 of bulk tank 60. Primary drive gear 100 is coupled to unloading auger 82 and to an input for transferring power from the input to unloading auger 82 to drive unloading auger 82 for rotation. Secondary drive gear 101 is drivingly coupled to driven gears 87 and 88 coupled to bulk tank augers 80 and 81, respectively, for transferring power from an input to driven gears 87 and 88 to drive driven gears 87 and 88 for rotation to, in turn, rotate bulk tank augers 80 and 81. Secondary drive gear 101 is concurrently drivingly coupled to driven gears 87 and 88 with an endless drive belt or roller chain 111, which concurrently encircles and meshingly interacts with secondary drive gear 101 and driven gears 87 and 88 and which transfers power from secondary drive gear 101 concurrently to driven gears 87 and 88 so as to drive driven gears 87 and 87 for rotation to rotate bulk tank augers 80 and 81 in response to rotation of secondary drive gear 101. Because secondary drive gear 101 is drivingly coupled to driven gears 87 and 88, driven gears 87 and 88 are, in turn, considered drivenly coupled to secondary drive gear 101.

Clutch 102 is coupled between primary drive gear 100 coupled to unloading auger 82 and secondary drive gear 101 drivingly coupled to driven gears 87 and 88. Clutch 102 operates between primary drive gear 100 coupled to unloading auger 82 and secondary drive gear 101 drivingly coupled to driven gears 87 and 88, and is movable between an engaged position securing primary drive gear 100 to secondary drive gear 101 for transferring power from primary drive gear 100 to secondary drive gear 101, and a disengaged position disengaging primary drive gear 100 from secondary drive gear 101 thereby isolating secondary drive gear 101 from primary drive gear 100.

With continuing reference to FIG. 3, clutch 102 is entirely conventional and, for reference purposes, has opposed drive and driven sides 102A and 102B. Primary drive gear 100 is coupled between unloading auger 82 and drive side 102A of clutch 102, and secondary drive gear 101 is coupled between driven gears 87 and 88 and driven side 102B of clutch 102. In particular, primary drive gear 100 is rigidly affixed to a drive shaft 103, which extends between and is concurrently coupled to unloading auger 82 and to drive side 102A of clutch 102. Secondary drive gear 101 is rigidly affixed to a driven shaft 104 that is coupled to drive side 102B of clutch 102. Drive shaft 103 is operatively coupled to unloading auger 82 in a conventional and well-known manner to impart rotation to unloading auger 82 in response to rotation of drive shaft 103. Rotation of unloading auger 82 is made through rotation of drive shaft 103, and rotation of drive shaft 103 is made through the application of in input to primary drive gear 100 to impart rotation to primary drive gear 100. Primary drive gear 100 is rigidly mounted to drive shaft 103, and drive shaft 103 provides a coupling of drive gear 100 to unloading auger 82 to impart rotation to unloading auger 82 in response to a corresponding input applied to drive gear 100 to drive the drive gear 100 for rotation. Secondary drive gear 101 is rigidly mounted to driven shaft 104, and driven shaft 104 provides a coupling of driven end 102B of clutch 102 to secondary drive gear 101 to impart rotation to secondary drive gear 101 in response to an input delivered to driven shaft 104 from drive shaft 103 through clutch 102 to impart rotation to driven shaft 104.

The input applied to primary drive gear 100 to forcibly rotate primary drive gear 100 is the conventional hydraulic drive system (not shown) of combine harvester 50. The hydraulic drive system of combine harvester 50 is operatively coupled to primary drive gear 100 with an endless drive belt or roller chain 110, which conventionally meshingly engages primary drive gear 100 and which transfers power from the hydraulic drive system of combine harvester 50 to primary drive gear 100 so as to drive primary drive gear 100 for rotation to rotate drive shaft 103 to, in turn, impart rotation to unloading auger 82 and to impart rotation to secondary drive gear 101 in the engaged position of clutch 102.

As explained above, clutch 102 is coupled between primary drive gear 100 and secondary drive gear 101, operates between primary drive gear 100 and secondary drive gear 101, and is movable between an engaged position for securing primary drive gear 100 to secondary drive gear 101 for transferring power from primary drive gear 100 to secondary drive gear 101 to render bulk tank augers 80 and 81 and unloading auger 82 concurrently operational, and a disengaged position disengaging primary drive gear 100 from secondary drive gear 101 thereby isolating secondary drive gear 101 from primary drive gear 100 disabling bulk tank augers 80 and 81 rendering only unloading auger 82 operational. In the engaged position of clutch 102, clutch 102 concurrently engages and secures drive shaft 103 and driven shaft 104 so as to rigidly secure drive shaft 103 with respect to driven shaft 104 thereby operatively and drivingly coupling or securing primary drive gear 100 to secondary drive gear 101. In this engaged position of clutch 102 securing primary drive gear 100 to secondary drive gear 101, primary drive gear 100 is concurrently secured or otherwise engaged to bulk tank and unloading augers 80,81,82 and rotation of primary drive gear 100 from an input applied to primary drive gear 100 from the hydraulic drive system of combine harvester 500 via drive belt 110 rotates drive shaft 103 which, in turn, concurrently drives unloading auger 82 and secondary drive gear 101, and the driving coupling between secondary drive gear 101 and driven gears 87 and 88 transfers rotation of secondary drive gear 101 to driven gears 87 and 88 imparting rotation to bulk tank augers 80 and 81 for grain conveyance. And so in the engaged position of clutch 102, unloading auger 82 and bulk tank augers 80 and 81 are ON and rotate and operate concurrently, in which bulk tank augers 80 and 81 receive grain in volume 60A of bulk tank 60 and convey grain horizontally through bulk tank 60 in the direction generally indicated by arrowed line A in FIGS. 2 and 3 to unloading auger 82, and unloading auger 82, in turn, receives grain from bulk tank augers 80 and 81 and conveys grain received from bulk tank augers 80 and 81 vertically through bulk tank 60 in the direction generally indicated by arrowed line B in FIG. 2 to grain unloading spout 71 in FIG. 1 for grain unloading in the normal manner.

In the disengaged position of clutch 102, clutch 102 disengages or otherwise releases drive shaft 103 disengaging or otherwise decoupling or releasing drive shaft 103 from driven shaft 104 thus disengaging or otherwise decoupling or releasing primary drive gear 100 from secondary drive gear 101 isolating secondary drive gear 101 from primary drive gear 100. In this disengaged position of clutch 102, rotation of primary drive gear 100 from an input applied to primary drive gear 100 from the hydraulic drive system of combine harvester 500 via drive belt 110 rotates drive shaft 103 which, in turn, drives only unloading auger 82, and the release of drive shaft 103 from driven shaft 104 isolates secondary drive gear 101 from primary drive gear 100 preventing power transfer from primary drive gear 100 to secondary drive gear 101 securing bulk tank augers 80 and 81 from rotation. And so in this disengaged position of clutch 102, primary drive gear 100 is engaged or otherwise secured only to unloading auger 82, bulk tank augers 150 are secure or otherwise OFF, and unloading auger 82 is ON and continues to convey grain received from bulk tank augers 80 and 81 vertically through bulk tank 60 in the direction generally indicated by arrowed line B in FIG. 2 to grain unloading spout 71 in FIG. 1 for grain unloading in the normal manner until empty.

Consistent with the foregoing discussion, to unload grain from grain bulk tank 60, such as when full, clutch 102 is moved or otherwise secured into its engaged position securing primary drive gear 100 to secondary drive gear 101 thereby concurrently securing or engaging primary drive gear 100 bulk tank augers 80 and 81 and unloading auger 82. At this point, the input is applied to primary drive gear 100 turning bulk tank augers 80 and 81 and unloading augers ON causing bulk tank augers 80 and 81 to convey grain horizontally through bulk tank 60 in the direction generally indicated by arrowed line A in FIGS. 2 and 3 to unloading auger 82, which receives grain from bulk tank augers 80 and 81 and conveys or pushes grain received from bulk tank augers 80 and 81 vertically through bulk tank 60 in the direction generally indicated by arrowed line B in FIG. 2 to grain unloading spout 71 in FIG. 1 for grain unloading in the normal manner. There may be an instance where it is desired to shut off bulk tank augers 80 and 81 to stop the grain unloading process and let unloading auger 82 continue to run until empty to make it easy to resume operation of bulk tank augers 80 and 81 and to prevent clogging. To do this, clutch 102 is moved from its engaged position to its disengaged position releasing drive shaft 103 from driven shaft 104 thereby isolating secondary drive gear 101 from primary drive gear 100, which turns bulk tank augers 80 and 81 OFF while leaving unloading auger 82 ON allowing unloading auger 82 to empty. After unloading auger 82 is empty and it is desired to turn bulk tank augers 80 and 81 back ON to resume grain unloading, clutch 102 may simply be moved back to its engaged position. Clutch 102 may be mechanically operated, but is preferably hydraulically or electrically operated, such as from controls located in the cab of combine harvester 50.

The invention has been described above with reference to a preferred embodiment. However, those skilled in the art will recognize that changes and modifications may be made to the embodiment without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A method of unloading grain from a grain bulk tank, comprising the steps of:

providing opposed first and second bulk tank augers and an unloading auger formed in the grain bulk tank, the first and second bulk tank augers are horizontal, the unloading auger is upright and is between the first and second bulk tank augers, the first bulk tank auger is housed in a first shroud, the second bulk tank auger is housed in a second shroud, the first shroud is formed with a first chute, the second shroud is formed with a second chute, the first chute extends downwardly from the first shroud to the unloading auger for delivering grain downwardly from the first bulk tank auger to the unloading auger, and the second chute extends downwardly from the second shroud to the unloading auger for delivering grain downwardly from the second bulk tank auger to the unloading auger;

filling the bulk tank auger with grain; and concurrently activating the first and second bulk tank augers and the unloading auger concurrently conveying the grain in the grain bulk tank horizontally through the first and second shrouds to the first and second chutes via the first and second bulk tank augers, delivering the grain downwardly from the first and second bulk tank augers to the unloading auger via the first and second chutes, and conveying the grain upright from the gain bulk tank to the grain unloading spout via the unloading auger.

2. A method of unloading grain from a grain bulk tank, comprising the steps of:

providing opposed first and second bulk tank augers and an unloading auger formed in the grain bulk tank, the first and second bulk tank augers are horizontal, the unloading auger is upright and is between the first and second bulk tank augers, the first bulk tank auger is housed in a first shroud, the second bulk tank auger is housed in a second shroud, the first shroud is formed with a first chute, the second shroud is formed with a second chute, the first chute extends downwardly from the first shroud to the unloading auger for delivering grain downwardly from the first bulk tank auger to the unloading auger, and the second chute extends downwardly from the second shroud to the unloading auger for delivering grain downwardly from the second bulk tank auger to the unloading auger;

filling the bulk tank auger with grain;
concurrently activating the first and second bulk tank augers and the unloading auger concurrently conveying grain in the grain bulk tank horizontally through the first and second shrouds to the first and second chutes via the first and second bulk tank augers, delivering the grain downwardly from the first and second bulk tank augers to the unloading auger via the first and second chutes, and conveying the grain upright from the gain bulk tank to the grain unloading spout via the unloading auger;
deactivating the first and second grain bulk tank augers halting grain delivering to the unloading auger and concurrently continuing activating the unloading auger; and
deactivating the unloading auger when emptied of grain.

* * * * *